United States Patent
Elliott et al.

(10) Patent No.: US 7,596,723 B2
(45) Date of Patent: Sep. 29, 2009

(54) APPARATUS, SYSTEM, AND METHOD FOR SELECTIVE CROSS COMMUNICATIONS BETWEEN AUTONOMOUS STORAGE MODULES

(75) Inventors: John Charles Elliott, Tucson, AZ (US); Robert Akira Kubo, Tucson, AZ (US); Gregg Steven Lucas, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 11/534,499

(22) Filed: Sep. 22, 2006

(65) Prior Publication Data

US 2008/0126697 A1     May 29, 2008

(51) Int. Cl.
     *G06F 11/00*     (2006.01)
(52) U.S. Cl. ............................. 714/43; 714/5
(58) Field of Classification Search ....................... None
See application file for complete search history.

(56) References Cited

U.S. PATENT DOCUMENTS

| | | | |
|---|---|---|---|
| 6,134,671 A | 10/2000 | Commerford et al. ........... 714/4 |
| 6,351,799 B1 | 2/2002 | Fodlmeier et al. ............. 712/20 |
| 6,606,630 B1 | 8/2003 | Gunlock ..................... 707/100 |
| 6,671,820 B1 | 12/2003 | Kelman .......................... 714/4 |
| 6,678,839 B2 * | 1/2004 | Mori ............................ 714/44 |
| 7,216,188 B2 * | 5/2007 | Reid et al. ..................... 710/74 |
| 7,234,023 B2 * | 6/2007 | Abe et al. ..................... 711/114 |
| 7,437,615 B2 * | 10/2008 | Iwamitsu et al. ............... 714/43 |
| 2003/0005352 A1 * | 1/2003 | Beer et al. ...................... 714/4 |
| 2003/0107987 A1 | 6/2003 | Kinstler ....................... 370/228 |
| 2004/0153529 A1 | 8/2004 | Rikitake et al. ............. 709/220 |
| 2005/0022050 A1 * | 1/2005 | Nagata et al. .................. 714/5 |
| 2005/0108593 A1 | 5/2005 | Purushothaman et al. ...... 714/4 |
| 2005/0281273 A1 * | 12/2005 | Lucas et al. ................. 370/401 |
| 2006/0117215 A1 * | 6/2006 | Yanagisawa ................... 714/5 |
| 2008/0010547 A1 * | 1/2008 | Nakashima et al. ........... 714/43 |

OTHER PUBLICATIONS

C.S. Raghavendra and M. Geria, "Optimal Loop Toplolgies For Distributed Systems", UCLA Computer Science Dept. University of California, IEEE 1981, pp. 218-223.

* cited by examiner

*Primary Examiner*—Christopher S McCarthy
(74) *Attorney, Agent, or Firm*—Kunzler & McKenzie

(57) ABSTRACT

An apparatus, system, and method are disclosed for selective cross communications between autonomous storage modules. A RAID controller communicates through a first cascading communications loop comprising a first storage module. The first storage module includes a plurality of storage devices and is disposed in an enclosure. The RAID controller also communicates through a second cascading communications loop comprising a second storage module. The second storage module also includes a plurality of storage devices and is disposed in the enclosure. An interface module transmits messages of the first loop through the second storage module. In one embodiment, the RAID controller communicates a cross communications command to the interface module through the second storage module to enable the interface module to transmit the messages of the first loop through the second storage module in response to a failure of the first loop upstream of the first storage module.

21 Claims, 8 Drawing Sheets

APPARATUS, SYSTEM, AND METHOD FOR SELECTIVE CROSS COMMUNICATIONS BETWEEN AUTONOMOUS STORAGE MODULES

BACKGROUND OF THE INVENTION

1. Field of the Invention

This invention relates to communications between storage modules and more particularly relates to selective cross communications between autonomous storage modules.

2. Description of the Related Art

A storage subsystem such as a redundant array of independent disks (RAID) storage subsystem may include a plurality of storage modules. The storage modules may be organized into one or more cascaded loops, herein referred to as loops.

In a loop, each storage module may be in communication with an upstream storage module and a downstream storage module. The loop may terminate with a most downstream storage module that does not communicate with a downstream storage module. In addition, the loop may begin with one or more loop controllers such as RAID controllers that write data to the storage modules and read data from the storage modules.

FIG. 1 is a schematic block diagram illustrating one embodiment of a storage subsystem 100 with a plurality of loops. The subsystem 100 includes one or more RAID controllers 105 and one or more storage units 110. A storage unit 110 may be a hard disk drive. The RAID controllers 105 control the storage units 110, writing data to and reading data from the storage units 110. The RAID controllers 105 may also perform maintenance functions on the storage units 110, such as initializing the storage units 110, formatting the storage units 110, and testing the storage units 110.

In the depicted embodiment, the storage units 110 are organized into cascaded loops 115, herein referred to as loops 115. Storage units 110 may be interconnected with communication cables such as small computer system interface (SCSI) cables, Fibre Channel cables, and the like to form the loops 115.

Each RAID controller 105 is shown in communication with each loop 115. Alternatively, each loop 115 may have one or more dedicated loop controllers. A RAID controller 105 may retrieve data from a storage unit 110 by communicating a command through a loop 115. For example, if a first RAID controller 105a needed to retrieve data from a fifth storage unit 110e, the first RAID controller 105a may communicate a command requesting the data to a first storage unit 110a. The first storage unit 110a may transmit the command to the third storage unit 110c, and the third storage unit 110c may then transmit the command to the fifth storage unit 110e.

Continuing the example above, the fifth storage unit 110e may retrieve the requested data after receiving the command and transmit the data to the third storage unit 110c. The third storage unit 110c may then transmit the data to the first storage unit 110a, and the first storage unit 110a transmit the data to the first RAID controller 105a.

Unfortunately, if a storage unit 110 fails, a RAID controller 105 may be unable to communicate with storage units 110 downstream of the failed storage unit 110. For example, if the third storage unit 110c fails, the first and second RAID controllers 105a, 105b are unable to communicate with the fifth and seventh storage controllers 110e, 110g.

Two or more storage units 110 may be configured in a single enclosure. For example, the first and a second storage unit 110a, 110b may each be disposed in a common enclosure, the third and a fourth storage unit 110c, 110d may each be disposed in another common enclosure, and so on. Placing a plurality of storage units 110 in a single enclosure may simplify setting up a plurality of loops 115 for the RAID storage controllers. In the depicted embodiment, each RAID controller 105 may be easily cabled to form two loops 115, with the loops 115 comprising storage units 110 that share enclosures.

Unfortunately, storage units 110 that fail within an enclosure also block access to downstream storage units 110. As a result, the RAID controllers 105 are unable to write data to and read data from downstream storage units 110 until the failed storage unit 110 is replaced and/or repaired. Storage units 110 may also become unavailable when an upstream storage unit 110 is removed, taken off line, or the like.

SUMMARY OF THE INVENTION

From the foregoing discussion, there is a need for an apparatus, system, and method that selectively provide cross communications between storage units of different loops. Beneficially, such an apparatus, system, and method would allow communication with storage units that are downstream in a loop from a failed and/or inoperable storage unit.

The present invention has been developed in response to the present state of the art, and in particular, in response to the problems and needs in the art that have not yet been fully solved by currently available cross communication methods. Accordingly, the present invention has been developed to provide an apparatus, system, and method for selective cross communications between storage modules that overcome many or all of the above-discussed shortcomings in the art.

The apparatus for selective cross communications is provided with a plurality of modules configured to functionally execute the steps of communicating through a first loop with a first storage module, communicating through a second loop with a second storage module, and transmitting messages of the first loop through the second storage module via an interface module. These modules in the described embodiments include the first storage module, the second storage module, and an interface module. The apparatus may also include a selection module.

The first storage module is disposed in an enclosure. In addition, the first storage module includes a plurality of storage devices. The first storage module communicates with the first loop. In one embodiment, the first storage module communicates with the first loop by communicating with an upstream device such as a RAID controller or another storage module. The first storage module may also communicate with the first loop by communicating with a downstream device.

The second storage module is also disposed in the enclosure. In addition, the second storage module is autonomous from the first storage module. The second storage module includes a plurality of storage devices and communicates with the second loop. In one embodiment, the second storage module communicates with the second loop by communicating with an upstream device such as the RAID controller or another storage module. The second storage module may also communicate with the second loop by communicating with a downstream device.

The interface module is in communication with the first and second storage modules. In one embodiment, the interface module is disposed in the enclosure with the first and second storage modules. The interface module may transmit messages of the first loop through the second storage module. In addition, the interface module may transmit messages of the second loop through the first storage module.

In one embodiment, the selection may communicate a cross communications command to the interface module in response to a failure of an upstream storage module. The command may enable the interface module to transmit the messages between the first and second storage modules. The apparatus allows selective cross communications between storage modules so that communications for a blocked loop may be rerouted through an active loop.

A system of the present invention is also presented for selective cross communications. The system may be embodied in a storage subsystem. In particular, the system, in one embodiment, includes a first loop, a second loop, and a plurality of enclosures. The system may also include one or more RAID controllers.

Each enclosure includes a first and a second storage module. The storage modules are mutually autonomous. The first and second loops carry communications between the storage modules of different enclosures. In addition, each loop may communicate with at least one RAID controller.

Each enclosure further includes an interface module. Each interface module is in communication with the first and second storage modules of the interface module's enclosure. The interface module transmits messages of the first loop through the second storage module and may transmit messages of the second loop through the first storage module. In one embodiment, the RAID controller communicates a cross communications command to the interface module to enable the interface module to transmit the messages in response to a failure of a storage module in an upstream enclosure. The system supports selective cross communication between storage modules communicating through different loops.

A method of the present invention is also presented for selective cross communications. The method in the disclosed embodiments substantially includes the steps to carry out the functions presented above with respect to the operation of the described apparatus and system. In one embodiment, the method includes communicating through a first loop with a first storage module, communicating through a second loop with a second storage module, and transmitting messages of the first loop through the second storage module via an interface module.

A RAID controller communicates through a first loop comprising a first storage module with a plurality of storage devices and disposed in an enclosure. The RAID controller also communicates through a second loop comprising a second storage module with a plurality of storage devices disposed in the enclosure. An interface module transmits messages of the first loop through the second storage module. In one embodiment, the RAID controller communicates a cross communications command to the interface module through the second storage module to enable the interface module to transmit the messages of the first loop through the second storage module in response to a failure of the first loop upstream of the first storage module. The method allows communications for the first loop to be rerouted through the second loop to mitigate a failure and/or unavailability of an upstream storage module of the first loop.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention selectively allows cross communications between different loops. In addition, the present invention may mitigate a failure and/or unavailability of a storage module in a loop by allowing communications to be routed around the storage module. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
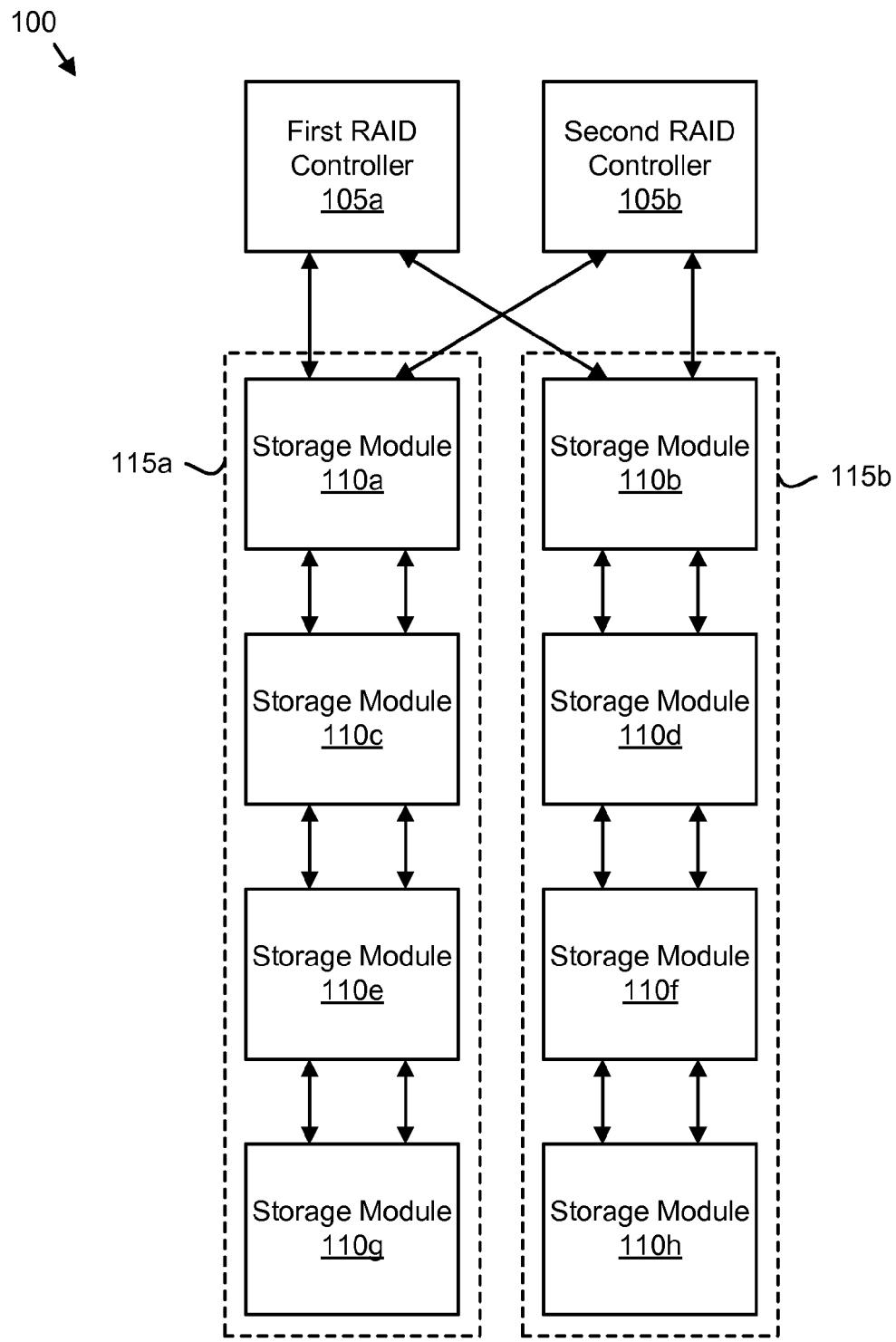
FIG. 1 is a schematic block diagram illustrating one embodiment of a storage subsystem.
Figure 2:
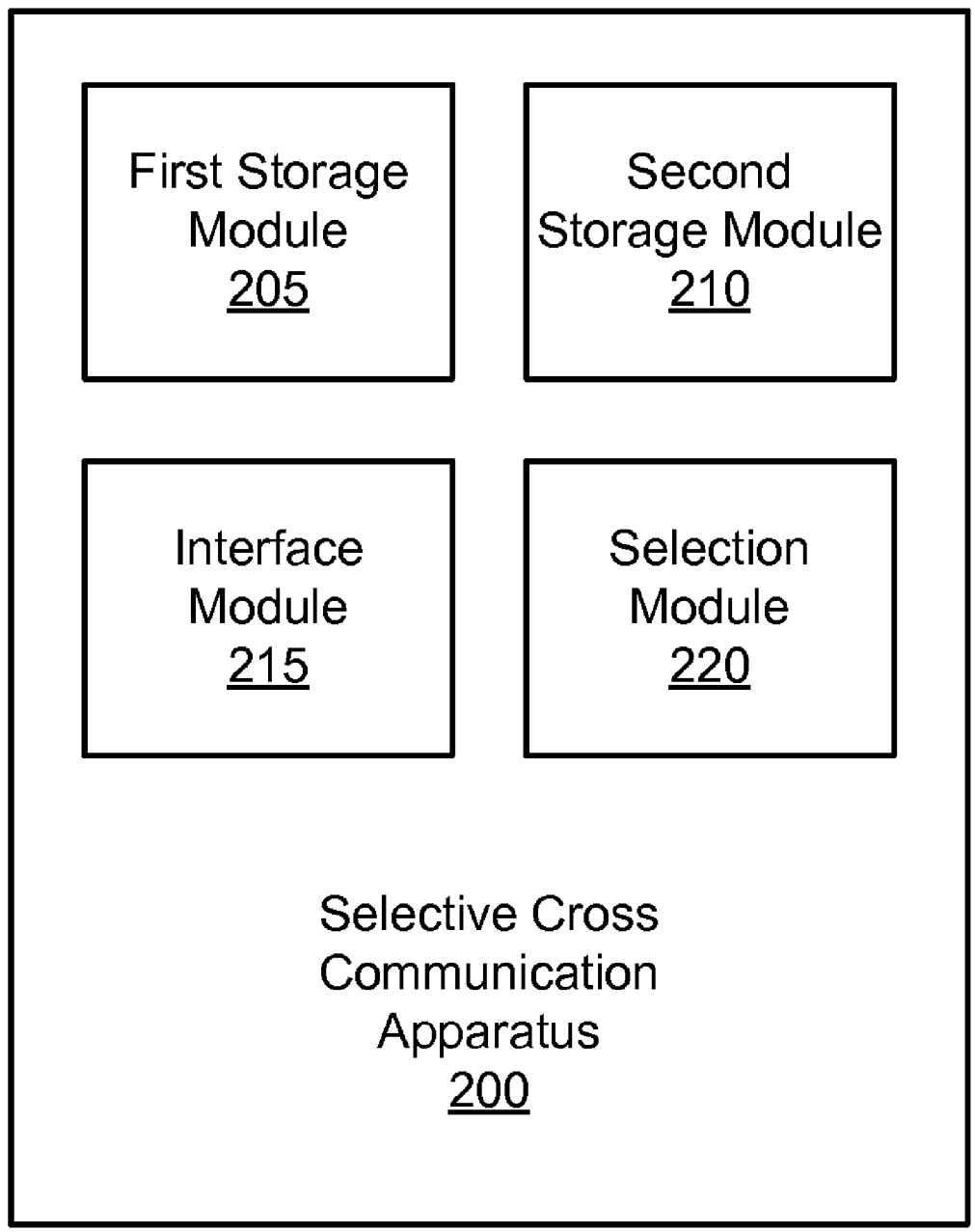
FIG. 2 is a schematic block diagram illustrating one embodiment of a selective cross communication apparatus of the present invention.

FIG. 2 is a schematic block diagram illustrating one embodiment of a selective cross communication apparatus 200 of the present invention. The apparatus 200 includes a first storage module 205, a second storage module 210, an interface module 215, and a selection module 220. The description of the apparatus 200 may refer to elements of FIG. 1, like numbers referring to like elements.

The first storage module 205 is disposed in an enclosure. The second storage module 210 is also disposed in the enclosure. In addition, the first and second storage modules 205, 210 include a plurality of storage devices. The storage devices may be configured as hard disk drives, optical storage devices, micromechanical storage devices, semiconductor storage devices, and the like.

The first and second storage modules 205, 210 may each be in communication with a different cascading loop 115 similar to the organization of the storage units 110 in FIG. 1. For example, the first storage module 205 may communicate with a first loop 115a while the second storage module 210 may communicate with a second loop 115b. In one embodiment, the first storage module 205 communicates with the first loop 115a by communicating with an upstream device such as a RAID controller 105 or another storage module 205. The first storage module 205 may also communicate with the first loop 115a by communicating with a downstream storage module 205. Similarly the second storage module 210 may communicate with upstream and downstream devices as will be described hereafter.

The interface module 215 is in communication with the first and second storage modules 205, 210. In one embodiment, the interface module 215 is disposed in the enclosure with the first and second storage modules 205, 210. The interface module 215 may transmit messages of the first loop through the second storage module as will be described hereafter. Alternatively, the interface module may transmit messages of the second loop through the first storage module.

In one embodiment, the selection module 220 directs the interface module 215 to transmit messages between the first and second storage modules 205, 210. The selection module 220 may be a software process executing on the RAID controller 105. The apparatus 200 allows cross communications between the first and second storage modules 205, 210 and the first and second loops 115a, 115b through the interface module 215.

Figure 3:
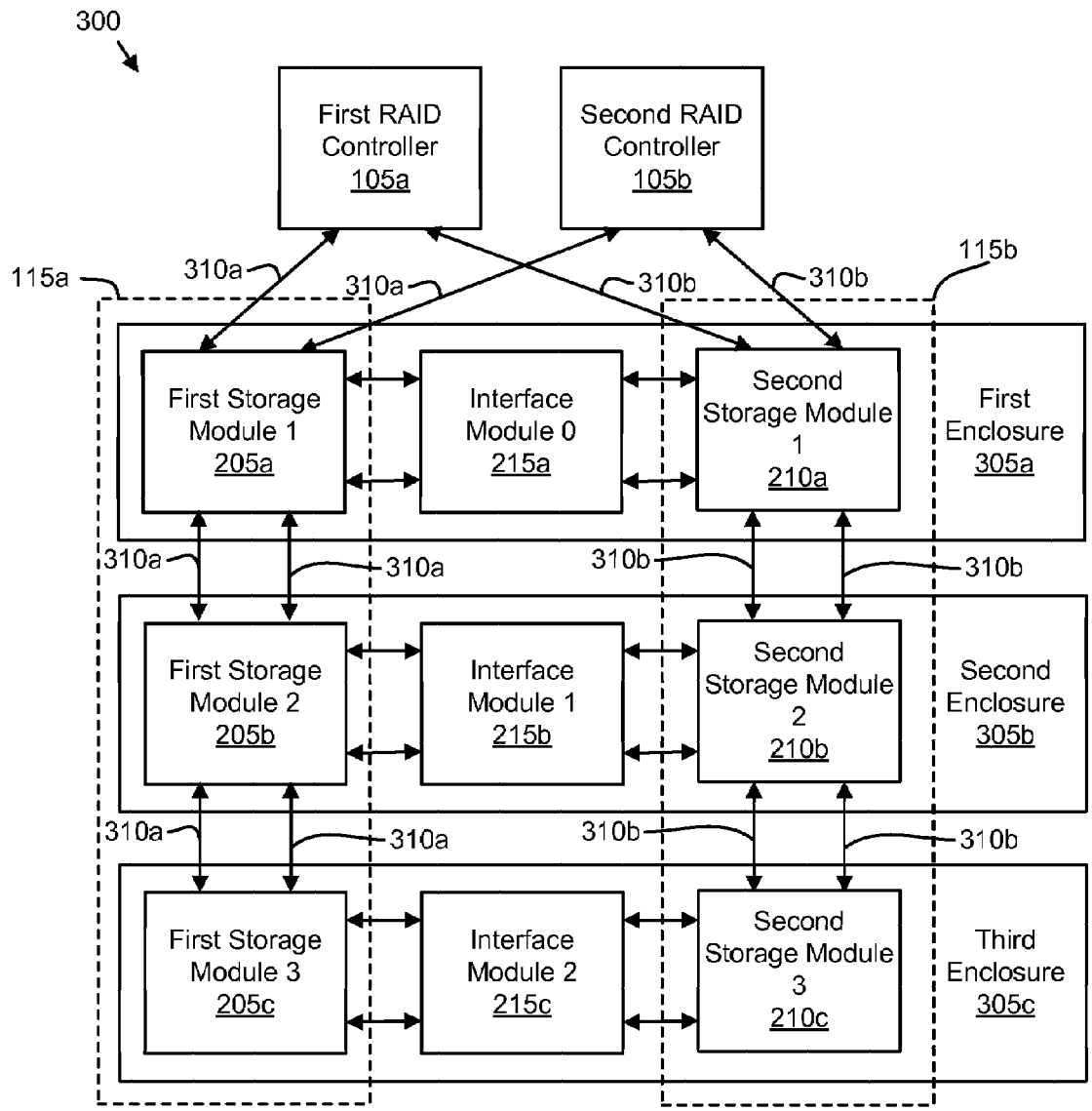
FIG. 3 is a schematic block diagram illustrating one embodiment of an enclosure-based storage subsystem of the present invention.

FIG. 3 is a schematic block diagram illustrating one embodiment of an enclosure-based storage subsystem 300 of the present invention. The subsystem 300 may embody the apparatus 200 of FIG. 2. The description of the subsystem 300 refers to elements of FIGS. 1-2, like numbers referring to like elements.

The RAID controllers 105 of FIG. 1 are shown in communication with a plurality of cascaded enclosures 305. In one embodiment, the enclosures 305 are configured to mount in an equipment rack. Each enclosure 305 may also include power supplies, fans, mounting hardware, and the like as is well known to those of skill in the art.

Each enclosure 305 includes a first storage module 205 and a second storage module 210. The first and second storage modules 205, 210 are organized as elements of first and second loops 115a, 115b. Each RAID controller 105 communicates with each loop 115.

In one embodiment, the loops 115 comprise the RAID controllers 105 and storage modules 205, 210 communicating over communication channels 310. In one embodiment, the communication channels 310 are configured as serial attached SCSI channels, herein referred to as SAS, as defined by the SCSI Trade Association. The communication channels 310 may also be configured as SCSI communication channels, Fibre Channel Arbitrated Loop communication channels, AT Attachment (ATA) channels, Serial ATA channels (SATA), or the like. In the depicted embodiment, the first loop 115a comprises elements of a first communication channel 310a and the first storage modules 205 while the second loop 115b comprises elements of a second communication channel 310b and the second storage modules 210. The communication channels 310 are shown as dual channels with dual cables. However, the communication channels 310 may comprise any number of cables, interfaces, and the like.

In one example, the second RAID controller 105b may store data to and retrieve data from the first storage modules 205 of the first loop 115a by communicating data and commands through the first loop 115a. The second RAID controller 105b may communicate a write command and data over the first communication channel 310a through the first storage modules 205 of first and second enclosures 305a, 305b to the first storage module 205 of the third enclosure 305c. The first storage module 205 of the third enclosure 305c may receive the write command and data and write the data to a storage device.

Similarly, the first RAID controller 105a may retrieve data from the second storage module 210 of the second enclosure 305b by communicating a read command through the second communication channel 310b and the second storage module 210 of the first enclosure 305a to the second storage module 210 of the second enclosure 305b. The second storage module 210 of the second enclosure 305b may retrieve the data from a storage device and communicate the data through the second communication channel 310b and the second storage module 210 of the first enclosure 305a to the first RAID controller 105a.

Thus the RAID controllers 105 communicate with the first storage modules 205 through the first loop 115a and the second storage modules 210 through the second loop 115b. The storage modules 205, 210 are autonomous. Thus the first storage module 205 may operate independently of the second storage module 210 and second storage module 210 may operate independently of the first storage module 205. For example, the first storage module 205 may operate even if the second storage module 210 fails and is inoperable.

In the past, if a first storage module 205 such as the first storage module 205 of the second enclosure 305b failed and/or became unavailable, the RAID controllers 105 are unable to communicate with storage modules downstream of the first storage module 205 of the second enclosure 305b such as the first storage module 205 of the third enclosure 305c. Thus, although the second storage modules 210 remain accessible through the second loop 115b, many of the first storage modules 205 were inaccessible.

The present invention employs the interface module 215 to reroute communications around breaks in a loop 115. The interface modules 215 of each enclosure 305 allow the RAID controllers 105 to communicate with storage modules 205, 210 that would be otherwise inaccessible due to the failure and/or unavailability of an upstream storage module 205, 210. The interface module 215 selectively provides for cross communications between the first loop 115a and the second loop 115b within an enclosure 305.

For example, if the first storage module 205 of the first enclosure 305a failed, the RAID controllers 105 may communicate with the first storage module 205 of the second enclosure 305b by routing communications through the second loop 115b to the second storage module 210 of the third enclosure 305c, through the interface module 215 of the third enclosure 305c to the first storage module 205 of the third enclosure 305c, and on to the first storage module 205 of the second enclosure 305b. Alternatively, the RAID controllers 105 may communicate with the first storage module 205 of the second enclosure 305b by routing communications through second loop 115b to the second storage module 210 of the second enclosure 305b and through the interface module 215 of the second enclosure 305b to the first storage module 205 of the second enclosure 305b.

Cross communications through the interface module 215 may be selectively initiated. In one embodiment, the selection module 220 may communicate a cross communications command to the interface module 215 in response to a failure of an upstream storage module 205, 210. In one embodiment, the selection module 220 is configured as one or more software processes executing on a RAID controller 105. Alternative, a storage module 205, 210 may include the selection module 220.

The cross communications command from the selection module 220 may enable the interface module 215 to transmit the messages between the first and second storage modules 205, 210. For example, the cross communications command may configure the interface module 215 as an element of a loop 115 and direct the interface module 215 to transmit messages for the loop 115. The present invention allows selective cross communications between storage modules 205, 210 so that messages for a blocked loop 115 may be rerouted through an active loop 115.

Although for simplicity the subsystem 300 is shown with two RAID controllers 105 and three enclosures 305, any number of RAID controllers 105 and enclosures 305 may be employed. In addition, each enclosure 305 may include two or more storage modules 205, 210 that are in communication with two or more loops 115.

Figure 4:
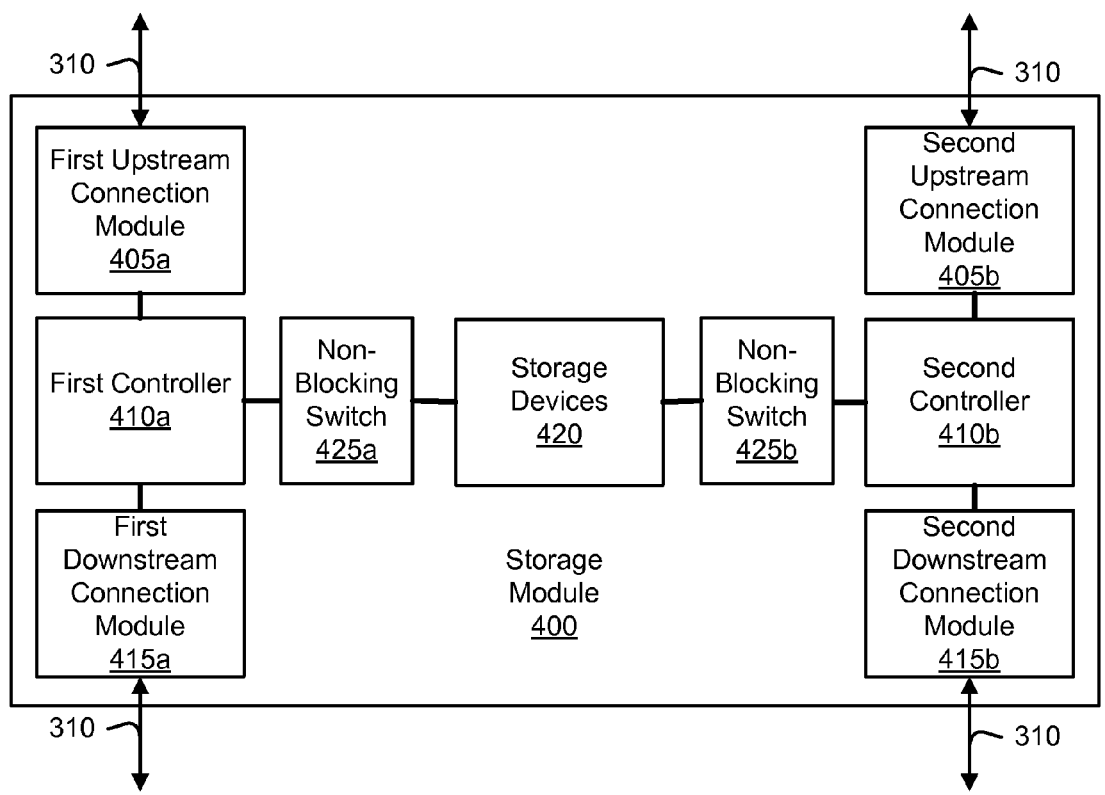
FIG. 4 is a schematic block diagram illustrating one embodiment of a storage module of the present invention.

FIG. 4 is a schematic block diagram illustrating one embodiment of storage module 400 of the present invention. The storage module 400 may be the first storage and second storage modules 205, 210 of FIG. 3. The description of the storage module 400 refers to elements of FIGS. 1-3, like numbers referring to like elements. The storage module 400 includes one or more upstream connection modules 405, one or more controllers 410, storage devices 420, one or more non-blocking switch 425, and one or more downstream connection modules 415.

The communication channel 310 is depicted as a dual communication channel 310, connecting with a first and second upstream connection module 405 and a first and second downstream connection module 415. Messages directed to upstream devices such as the RAID controllers 105 may be transmitted through the upstream connection modules 405 while messages directed to downstream devices such as a downstream storage module 205, 210 may be transmitted through the downstream connection modules 415.

The controllers 410 may include one or more processors and one or more memories as are well known to those of skill in the art. The controllers 410 may also include other connectors and electrical devices. The processors, memories and other devices may be fabricated of semiconductor gates on one or more semiconductor substrates. Each semiconductor substrate may be packaged in one or more semiconductor devices mounted on circuit cards. Connections between the processors, memories, and other devices may be through semiconductor metal layers, substrate-to-substrate wiring, circuit card traces, and/or wires connecting the semiconductor devices. The processors and memories may also communicate with one or more connectors that are configured to communicate with electrical devices such as the upstream connection modules 405, the downstream connection modules 415 and the interface module 215.

The memories may store software instructions and data. The processors may execute the software instructions and manipulate the data as is well know to those skilled in the art. In one embodiment, the processors execute and the memories store one or more software processes comprising the selection module 220.

The upstream connection modules 405 and the downstream connection modules 415 may be configured as SCSI interfaces, Fibre Channel interfaces, and the like. In one embodiment, the upstream connection modules 405 and the downstream connection modules 415 are configured as one or more adapter circuit cards that communicate with the controllers 410 through an electronic bus.

The storage module 400 is shown with two controllers 410. However, any number of controllers 410 may be employed. In one embodiment, the storage module 400 includes a controller 410 for each instance of the communication channel 310 in communication with the storage module 400.

The storage devices 420 may be configured as hard disk drives, optical storage devices, micromechanical storage devices, semiconductor storage devices, and the like. Each controller 410 may communicate with each storage device of the storage devices 420.

The controllers 410 receive commands and data from the RAID controllers 105 through the communication channels 310 of the loop 115. The controllers 410 write data to and read data from the storage devices 420 in response to the commands and/or data. For example, a RAID controller 105 may communicate a write command and data to the first controller 410a. The first controller 410a may write the data to storage devices 420 in response to the command.

In one embodiment, the controllers 410 communicate with the storage devices 420 through the non-blocking switches 425. A non-blocking switch 425 may provide a communication channel between a controller 410 and any storage device of the storage devices 420.

The storage module 400 may include the redundant communication channels 310, upstream connection modules 405, downstream connection modules 415, and controllers 410 so that if any one communication channel 310, upstream connection module 405, downstream connection module 415, and/or controller 410 failed, the storage module 400 could still write data to and retrieve data from the storage devices 420 as will be described hereafter.

The interface module 215 of the present invention provides additional redundancy against failures to the storage subsystem 300. The additional redundancy increases the reliability of the storage subsystem 300.

Figure 5:
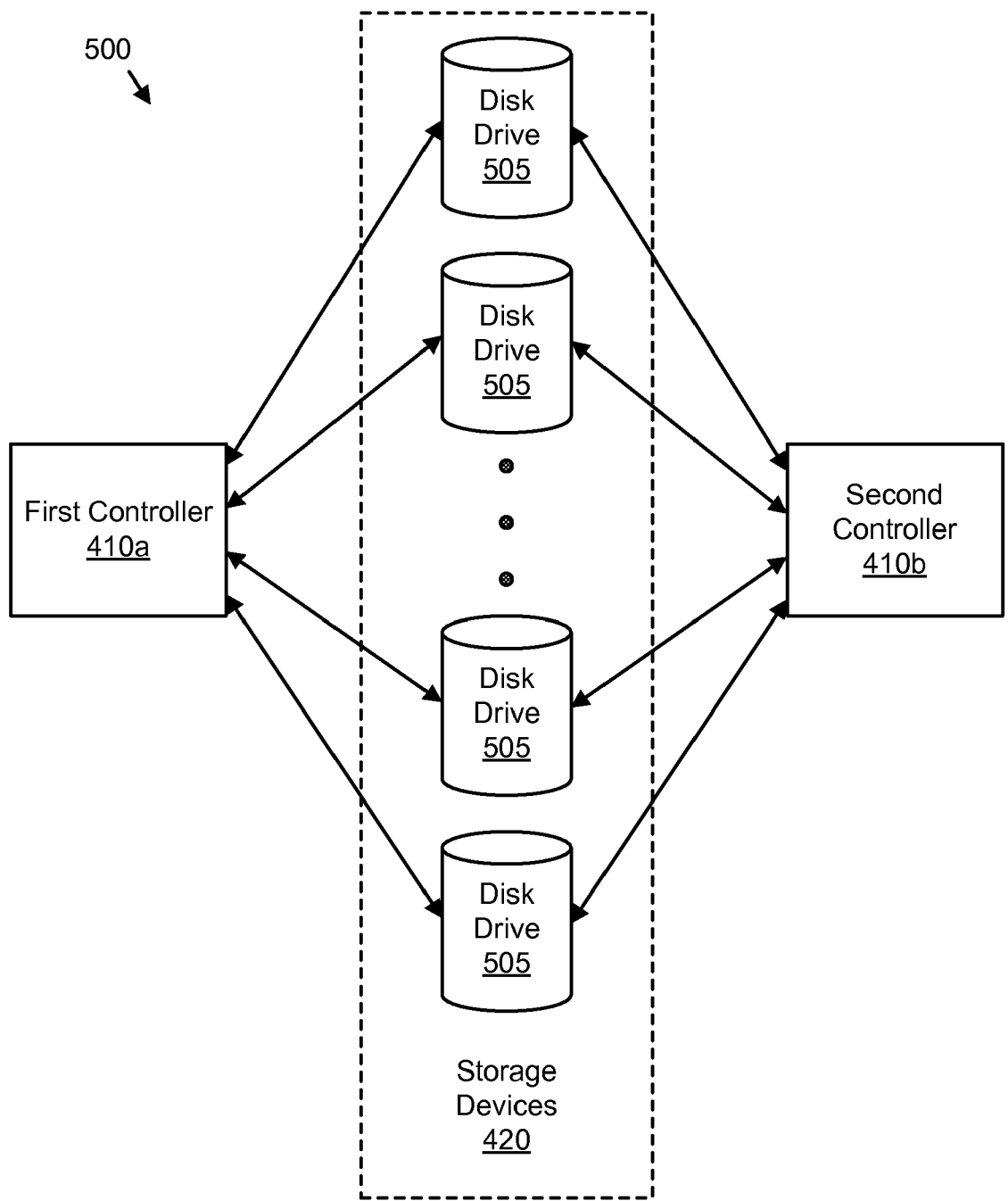
FIG. 5 is a schematic block diagram illustrating one embodiment of an enclosure controller/storage device system of the present invention.

FIG. 5 is a schematic block diagram illustrating one embodiment of an enclosure controller/storage device system 500 of the present invention. The system 500 is one example of interconnections between the controllers 410 and the storage devices 420 of FIG. 4. The description of the system 500 refers to elements of FIGS. 1-4, like numbers referring to like elements. The system 500 includes one or more controllers 410 and one or more disk drives 505. The disk drives 505 may be configured as a "switched bunch of disks" and embody the storage devices 420 of FIG. 4.

In the depicted embodiment, each controller 410 has a point-to-point connection with each disk drive 505. Thus each controller 410 may communicate with each disk drive 505, even if the other controller 410 fails.

Figure 6:
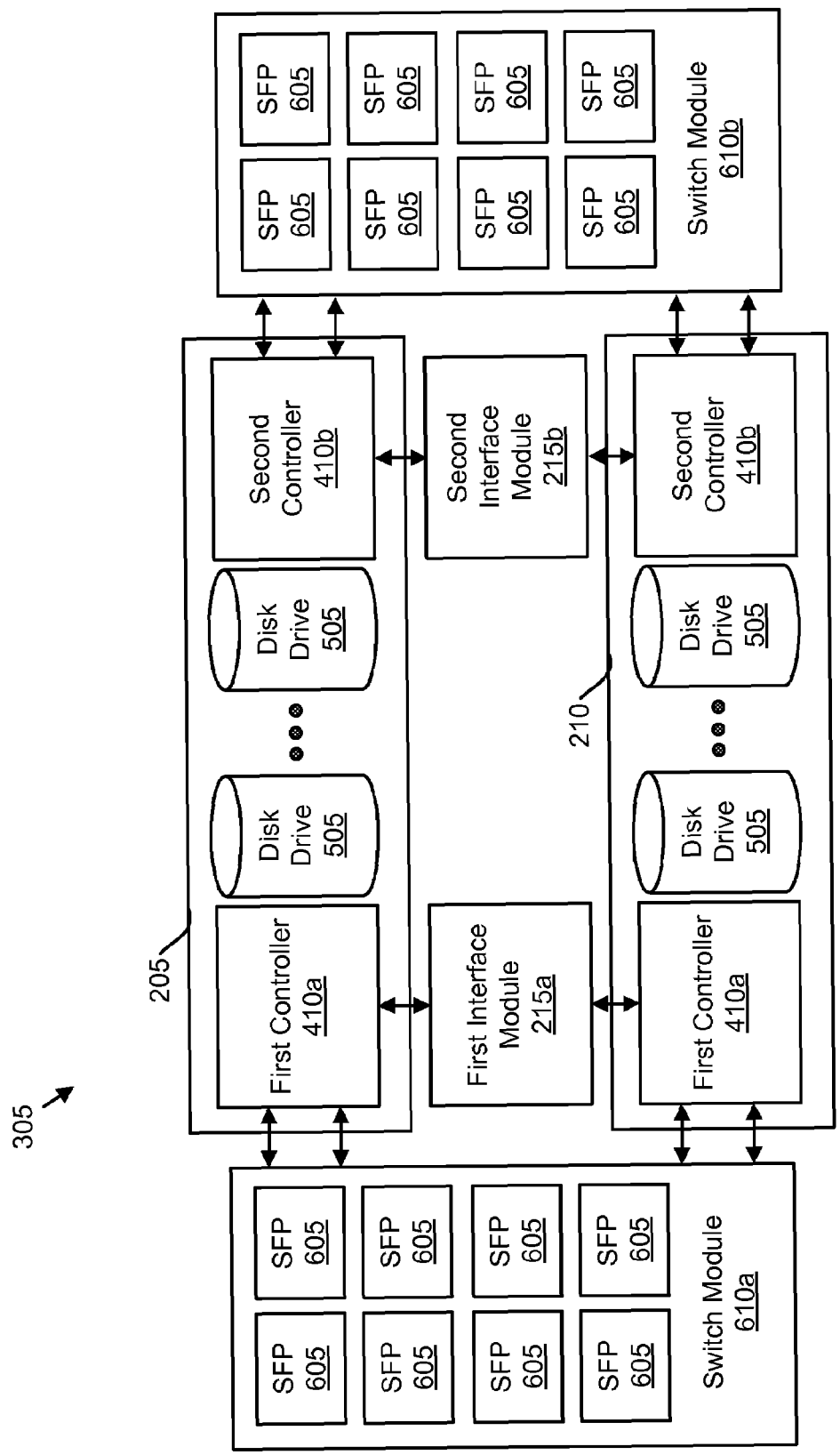
FIG. 6 is a schematic block diagram illustrating one alternate embodiment of an enclosure of the present invention.

FIG. 6 is a schematic block diagram illustrating one alternate embodiment of an enclosure 305 of the present invention. The enclosure 305 may embody the enclosure 305 of FIG. 3. The description of the enclosure 305 refers to elements of FIGS. 1-5, like numbers referring to like elements.

The enclosure 305 includes the first and second storage modules 205, 210 of FIGS. 3 and 4. Each storage module 205, 210 includes one or more controllers 410 and one or more disk drives 505. The controllers 410 may communicate with the disk drives through the non-blocking switch 425 of FIG. 4. Alternatively, the controllers 410 may communicate point-to-point with the disk drives 505 as shown in FIG. 5.

The storage modules 205, 210 communicate with a loop 115 through a switch module 610. Each switch module 610 includes a plurality of small form-factor pluggable connections (SFP) 605. SFPs 605 may be optical connections, electrical connections, and the like. The SFPs 605 may provide communications between the storage modules 205, 210 of one or more enclosures 305 and between the storage modules 205, 210 and the RAID controllers 105. In one embodiment, the SFPs 605 interface with communications channels 310.

The interface modules 215 provide communication paths between the first storage module 205 and the second storage module 210 that will be described hereafter. In one embodiment, a first interface module 215a is configured to provide cross communications between the first controller 410a of the first storage module 205 and the first controller 410a of the second storage module 210.

In addition, a second interface module 215b may provide cross communications between the second controller 410b of the first storage module 205 and the second controller 410b of the second storage module 210. Thus if the first controller 410a of the first storage module 205 fails, the enclosure 305 may provide cross communications between the first and second storage modules 205, 210 through the second controller 410b of the first storage module 205, the second interface module 215b, and the second controller 410b of the second storage module 210.

Figure 7:
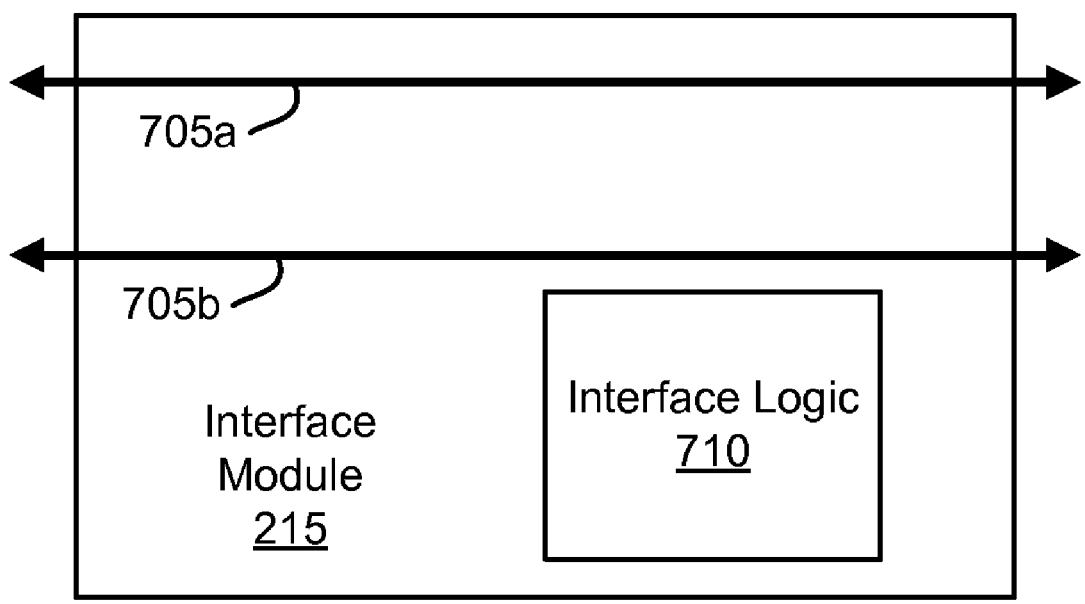
FIG. 7 is a schematic block diagram illustrating one embodiment of an interface module of the present invention.

FIG. 7 is a schematic block diagram illustrating one embodiment of an interface module 215 of the present invention. The interface module 215 may be the interface module of FIGS. 2, 3, and 6. The description of the interface module 215 refers to elements of FIGS. 1-6, like numbers referring to like elements.

The interface module 215 includes one or more communication paths 705. In one embodiment, the communication paths 705 are configured as in-band communications path between the first storage module 205 and the second storage module 210. As used herein, the in-band communications path employs the communications interface of the communications channel 310. Thus, if the communications channel 310 is a SAS communications channel, the communications path 705 of the interface module 215 employs a SAS communications path.

In an alternate embodiment, the communications paths 705 are configured as an out-of-band communications path between the first storage module 205 and the second storage module 210. As used herein, the out-of-band communications path employs a communications interface different from the communications interface of the communications channel 310. The out-of-band communications path may be configured as an RS-232 interface, a universal serial bus (USB) interface, an IEEE 1394 interface as defined by the Institute of Electrical and Electronic Engineers of New York, N.Y., and the like. Thus, if the communications channel 310 employs a Fibre Channel Arbitrated Loop communications channel, the interface module 215 may employ a USB communications path.

The interface module 215 may also include interface logic 710. In one embodiment, the interface logic 710 functions as an upstream connection module 405 and a downstream connection module 415, connecting the interface module 215 and communications path 705 to the communications channel 310.

In an alternate embodiment, the interface logic 710 interfaces the communications channel 310 with an out-of-band communications path 705. For example, if the communications channel 310 is configured as a Fibre Channel Arbitrated Loop and the communications path 705 is configured as an RS-232 bus, the interface logic 710 may convert Fibre Channel Arbitrated Loop communications to RS-232 communications and RS-232 communications to Fibre Channel Arbitrated Loop communications.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 8:
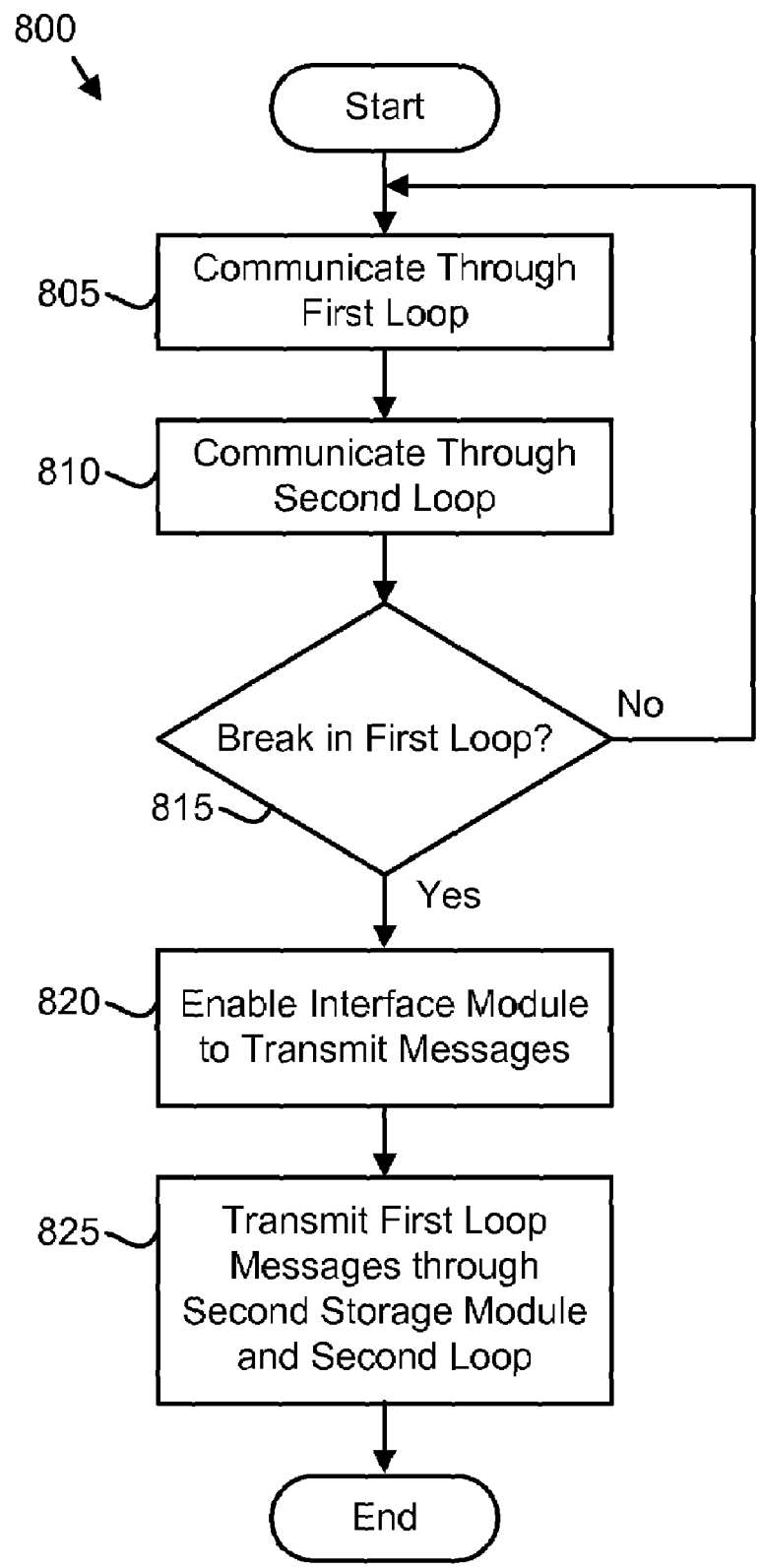
FIG. 8 is a schematic flow chart diagram illustrating one embodiment of a selective cross communication method of the present invention.

FIG. 8 is a schematic flow chart diagram illustrating one embodiment of a selective cross communication method 800 of the present invention. The method 800 substantially includes the steps to carry out the functions presented above with respect to the operation of the described apparatus 200, 215 and system 300, 400, 500, 600 of FIGS. 2-7. The description of the method 800 refers to elements of FIGS. 1-7, like numbers referring to like elements.

The method 800 begins, and the RAID controller 105 communicates 805 through the first loop 115a. Although for simplicity the method 800 is described for the single RAID controller 105, any number of RAID controllers 105 may be employed. The first loop 115a includes a plurality of cascaded first storage modules 205 interconnected by the first communications channel 310a. Each first storage module 205 includes a plurality of storage devices 420. The RAID controller 105 may store data to and retrieve data from the storage devices 420 by communicating with the first storage module 205 through the first loop 115a. The first storage module 205 is disposed in an enclosure 305.

The RAID controller 105 also communicates 810 through a second loop 115b. The second loop 115b includes a plurality of cascaded second storage modules 210 interconnected by the second communications channel 310b. Each second storage module 210 includes a plurality of storage devices 420. The RAID controller 105 may store data to and retrieve data from the storage devices 420 by communicating with the second storage module 210 through the second loop 115b. The second storage module 210 is also disposed in the enclosure 305.

In one embodiment, the RAID controller 105 determines 815 if there is a break in the first loop 115a. Although either the first loop 115a or the second loop 115b may break, for simplicity the method 800 is described for a break in the first loop 115a. The RAID controller 105 may determine 815 that there is a break in the first loop 115a if the RAID controller 105 cannot communicate with one or more storage modules 205, 210 in the first loop 115 a. Alternatively, the RAID controller 105 may determine 815 there is a break if a first storage module 205 is taken offline.

In an alternate embodiment, a controller 410 of a first storage module 205 determines 815 if there is a break in the first loop 115a. The controller 410 may determine 815 that there is a break in the first loop 115a if the first storage module 205 cannot communicate with one or more other first storage modules 205 and/or one or more RAID controllers 105.

If the RAID controller 105 and/or controller 410 determine 815 that there is no break in a loop 115, the RAID controller 105 loops to communicate 805 through the first loop 115a. If the RAID controller 105 and/or controller 410 determine 815 that there is a break in the loop 115a, the RAID controller 105 and/or controller 410 may enable the interface module 215 to transmit 820 messages of the first loop 115a through the second loop 115b. In one embodiment, the RAID controller 105 and/or controller 410 select an interface module 215 from a plurality of interface modules 215 disposed in one or more enclosures 305 to transmit 820 messages.

In one embodiment, the RAID controller 105 communicates a cross communications command to the interface module 215 through a storage module 205, 210 to enable the interface module 215 to transmit the messages. The cross communications command may be directed to the selected interface module 215. In addition, the cross communications command may configure the interface module 215 to function as part of the second loop 115b. The method 800 allows communications for the first loop 115a to be rerouted through the second loop 115b to mitigate a failure and/or unavailability of an upstream first storage module 205 of the first loop 115a. Thus, the RAID controller 105 may access data from storage modules 205, 210 downstream of a broken loop 115.

The present invention selectively allows cross communications between different loops 115. In addition, the present invention may mitigate a failure and/or unavailability of a storage module 205, 210 in a loop 115 by allowing communications to be routed around the storage module 205, 210.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for selective cross communications, the apparatus comprising:

a first storage module disposed in an enclosure, comprising a plurality of storage devices, and in communication with an upstream first storage module disposed in an upstream enclosure and a downstream first storage module disposed in a downstream enclosure through a cascading first loop;

a second storage module disposed in the enclosure, autonomous from the first storage module, comprising a plurality of storage devices, and in communication with an upstream second storage module disposed in the upstream enclosure and a downstream second storage module disposed in the downstream enclosure through a cascading second loop;

an interface module in communication with the first and second storage modules, disposed in the enclosure and transmitting messages of the cascading first loop through the second storage module and cascading second loop;

a code storage device storing executable code; and a processor executing the executable code, the executable code comprising a selection module enabling the interface module to transmit the messages of the cascading first loop through the second storage module in response to a failure of the cascading first loop upstream of the first storage module.

2. The apparatus of claim 1, wherein the storage modules each comprise a controller that communicates with the respective cascading loops and the respective plurality of storage devices of the storage module.

3. The apparatus of claim 2, wherein each controller communicates with the respective plurality of storage devices of the storage module through a non-blocking switch.

4. The apparatus of claim 2, wherein each controller communicates point-to-point with each of the respective plurality of storage devices of the storage module.

5. The apparatus of claim 2, wherein the storage modules each comprise a plurality of redundant controllers.

6. The apparatus of claim 1, wherein each cascading loop is a Fibre Channel loop.

7. The apparatus of claim 1, wherein each cascading loop is a serial attached small computer system interface (SAS) loop.

8. The apparatus of claim 1, wherein the interface module comprises an in-band communications path.

9. The apparatus of claim 1, wherein the interface module comprises an out-of-band communications path.

10. The apparatus of claim 1 wherein the selection module selects a path of rerouting messages from the failed upstream first storage module in the upstream enclosure to the first storage module in the enclosure by routing communications through the second cascading loop to the downstream second storage module of the downstream enclosure, through the interface module of the downstream enclosure to the downstream first storage module of the downstream enclosure, and on to the first storage module of the enclosure.

11. A code storage device storing executable code executed by a processor, wherein the executable code when executed on at least one redundant array of independent disks (RAID) controller causes the RAID controller to:

communicate with an upstream first storage module disposed in an upstream enclosure and a downstream first storage module disposed in a downstream enclosure through a cascading first loop comprising a first storage module with a plurality of storage devices disposed in an enclosure;

communicate with an upstream second storage module disposed in an upstream enclosure and a downstream second storage module disposed in a downstream enclosure through a cascading second loop comprising a second storage module with a plurality of storage devices disposed in the enclosure;

enable transmitting the messages of the cascading first loop through the second storage module in response to a failure of the cascading first loop upstream of the first storage module;

transmit messages of the cascading first loop through the second storage module via an interface module disposed in the enclosure.

12. The code storage device of claim 11, wherein each storage module includes at least one controller.

13. The code storage device of claim 12, wherein each controller communicates with the respective plurality of storage devices of the storage module through a non-blocking switch.

14. The code storage device of claim 11, wherein each cascading loop is a Fibre Channel loop.

15. The code storage device of claim 11, wherein each cascading loop is a SAS loop.

16. The code storage device of claim 11 wherein the executable code executed on the RAID controller causes the controller to select a path of rerouting messages from the failed upstream first storage module in the upstream enclosure to the first storage module in the enclosure by routing communications through the second cascading loop to the downstream second storage module of the downstream enclosure, through the interface module of the downstream enclosure to the downstream first storage module of the downstream enclosure, and on to the first storage module of the enclosure.

17. A system for selective cross communications, the system comprising:

a cascading first loop transmitting communications between storage modules;

a cascading second loop transmitting communications between storage modules;

a plurality of enclosures, each comprising a first storage module comprising a plurality of storage devices, and in communication with an upstream first storage module disposed in an upstream enclosure and a downstream first storage module disposed in a downstream enclosure through the cascading first loop;

a second storage module, autonomous from the first storage module, comprising a plurality of storage devices and in communication with an upstream second storage module disposed in the upstream enclosure and a downstream second storage module disposed in the downstream enclosure though the cascading second loop;

an interface module in communication with the first and second storage modules and transmitting messages of the cascading first loop through the second storage module and cascading second loop;

a code storage device storing executable code; and a processor executing the executable code, the executable code comprising a selection module enabling the interface module to transmit the messages of the first cascading loop through the second storage module in response to a failure of the first cascading loop upstream of the first storage module.

18. The system of claim 17, wherein each storage module comprises at least one controller communicating with the plurality of storage devices of the storage module through a non-blocking switch.

19. The system of claim 17 wherein the selection module selects a path of rerouting messages from the failed upstream first storage module in the upstream enclosure to the first storage module in the enclosure by routing communications through the second cascading loop to the downstream second storage module of the downstream enclosure, through the interface module of the downstream enclosure to the downstream first storage module of the downstream enclosure, and on to the first storage module of the enclosure.

20. A method for deploying computer infrastructure, comprising integrating a code storage device storing computer-readable code into a computing system, wherein the code in combination with the computing system is capable of performing the following:

communicating with an upstream first storage module disposed in an upstream enclosure and a downstream first storage module disposed in a downstream enclosure through a cascading first loop comprising a first storage module with a plurality of storage devices disposed in an enclosure;

communicating an upstream second storage module disposed in the upstream enclosure and a downstream second storage module disposed in the downstream enclosure through a cascading second loop comprising a second storage module with a plurality of storage devices disposed in the enclosure;

communicating a cross communications command to an interface module through the second storage module to enable the interface module to transmit the messages of the cascading first loop through the second storage module in response to a failure of the cascading first loop upstream of the first storage module; and transmitting messages of the cascading first loop through the second storage module via the interface module.

21. The method of claim 20 wherein the computer readable code causes the computing system to select a path of rerouting messages from the failed upstream first storage module in the upstream enclosure to the first storage module in the enclosure by routing communications through the second cascading loop to the downstream second storage module of the downstream enclosure, through the interface module of the downstream enclosure to the downstream first storage module of the downstream enclosure, and on to the first storage module of the enclosure.

* * * * *